US009683913B2

(12) United States Patent
Munger et al.

(10) Patent No.: US 9,683,913 B2
(45) Date of Patent: Jun. 20, 2017

(54) SYSTEM AND METHOD FOR EVALUATING REMAINING LIFE OF AN OPERATIVE SUB-SYSTEM OF A VEHICLE

(71) Applicant: THE BOEING COMPANY, Chicago, IL (US)

(72) Inventors: Cary D. Munger, Woodinville, WA (US); Nicholas Samuel Lee Smith, Renton, WA (US); Steven F. Griffin, Kihei, HI (US)

(73) Assignee: The Boeing Company, Chicago, IL (US)

(*) Notice: Subject to any disclaimer, the term of this patent is extended or adjusted under 35 U.S.C. 154(b) by 172 days.

(21) Appl. No.: 14/338,381

(22) Filed: Jul. 23, 2014

(65) Prior Publication Data
US 2016/0025590 A1    Jan. 28, 2016

(51) Int. Cl.
| | |
|---|---|
| G01H 1/00 | (2006.01) |
| G01M 7/02 | (2006.01) |
| G07C 5/08 | (2006.01) |
| G01M 7/08 | (2006.01) |
| G01M 17/007 | (2006.01) |
| B64D 45/00 | (2006.01) |

(52) U.S. Cl.
CPC .......... G01M 7/025 (2013.01); G01M 7/08 (2013.01); G01M 17/007 (2013.01); G07C 5/0808 (2013.01); *B64D 2045/0085* (2013.01)

(58) Field of Classification Search
CPC .................................. G01M 7/025; G01M 7/08
USPC .......................................................... 73/658
See application file for complete search history.

(56) References Cited

U.S. PATENT DOCUMENTS

| 8,011,255 B2 | 9/2011 | Arms | |
|---|---|---|---|
| 2007/0001052 A1* | 1/2007 | Strehlow | B64C 27/001 244/99.1 |
| 2008/0036617 A1* | 2/2008 | Arms | B64C 27/006 340/679 |
| 2008/0140349 A1* | 6/2008 | Behera | G05B 23/0283 702/182 |
| 2011/0022524 A1* | 1/2011 | Monahan | G01R 31/3025 705/302 |
| 2011/0106510 A1* | 5/2011 | Poon | G05B 23/0283 703/2 |

(Continued)

FOREIGN PATENT DOCUMENTS

| CA | 2587750 | 5/2006 |
|---|---|---|
| GB | 2497413 | 6/2013 |

OTHER PUBLICATIONS

Extended European Search Report for EP App No. 15176491.7-1953, dated Nov. 13, 2015.

*Primary Examiner* — Robert Huber
*Assistant Examiner* — Tarun Sinha
(74) *Attorney, Agent, or Firm* — Joseph Butscher; The Small Patent Law Group, LLC

(57) ABSTRACT

A vehicle may include an operative sub-system positioned within a body of the vehicle, and a sensor assembly secured to the operative sub-system. The sensor assembly may include at least one sensor configured to detect vibration or shock energy, directed into the operative sub-system; and a processing unit configured to determine damage to the operative sub-system as damage data that is based on one or both of a magnitude and duration of the vibration or shock energy detected by the sensor(s). The sensor assembly may be self-powered.

17 Claims, 4 Drawing Sheets

(56) References Cited

U.S. PATENT DOCUMENTS

2012/0130655 A1* 5/2012 Mitsuda ............. G01R 31/3679
702/58
2015/0367963 A1* 12/2015 Swearingen .......... B64F 5/0045
701/31.4

* cited by examiner

SYSTEM AND METHOD FOR EVALUATING REMAINING LIFE OF AN OPERATIVE SUB-SYSTEM OF A VEHICLE

BACKGROUND OF THE DISCLOSURE

Embodiments of the present disclosure generally relate to systems and methods for evaluating remaining life of an operative sub-system of a vehicle.

Various vehicles have numerous electronics hardware and sub-systems that are used during operation of the vehicles. For example, a typical aircraft includes numerous electronics systems positioned throughout the aircraft. At least some of the electronics systems may be vital to the performance or intended mission of the aircraft. For example, an airplane may include radar electronics in a forward portion of the fuselage and hydraulic and pneumatic systems throughout the fuselage. Various military aircraft include a broad suite of systems and electronics, many of which are mission and/or flight critical systems.

Before an electronics system is installed onto an aircraft, an area of the aircraft at which the electronics system is to be placed is analyzed to determine the amount of vibration and shock to occur at the particular area during operation of the aircraft. An analysis may also be made as to how the aircraft is to be flown. Both analyses are used to determine the magnitude and time of force that may be exerted into the area of the aircraft during flight. A vibration profile may then be determined for the particular area of the aircraft.

The electronics system may then be tested, such as with respect to a vibration table that may be used to shake the electronics systems, to determine a predicted life of the electronics system at the particular area of the aircraft. For example, an electronics system that is to be used on an aircraft may be rated and qualified to survive expected vibrations during flight by performing a vibration and shock qualification test. The vibration levels used during the vibration and shock qualification test provide vibration load prediction data that is based on system weight, location in the aircraft, and assumed flight profiles.

After the electronics systems is tested and positioned at an area of the aircraft, the electronics system is monitored by an individual during the life of the aircraft in relation to the vibration and shock profile of the particular area of the aircraft in which the electronics system is located, and the predicted life of the electronics systems at the particular area. For example, the individual typically tracks the serial number of the electronics system, and matches the serial number with a predicted lifetime at a particular area of the aircraft. Each time the aircraft is flown, the individual tracks the time of flight and determines the remaining life of the electronics system based on the time of flight. The individual may then store the remaining life in a computer database, for example. The database is continually updated by the individual after each flight of the aircraft.

As can be appreciated, the process of monitoring and tracking each electronics system is labor and time intensive. Further, accurate data regarding the remaining life is dependent upon an individual monitoring the aircraft and the electronics system, and entering and updating information regarding the remaining life. However, human error may produce inaccurate remaining life information. For example, an individual may forget to input data (or input erroneous data) regarding the electronics system after a particular flight.

An electronics system may also be mounted in a different manner, thereby causing the system to experience vibration loads that were not expected, predicted, or otherwise anticipated during testing. Also, the original testing and/or specifications of the system may be in error. In such scenarios, even if the individual is accurately tracking the electronics system during the life of the aircraft, the recorded data may be inaccurate, thereby leading to unreliable remaining life information regarding the electronics system.

Further, if the electronics system is to be moved to another location of the aircraft (or even to a different aircraft), the entire testing process is typically repeated, in order to provide an accurate vibration profile and predicted life of the electronics system at the new location. Such additional testing is time and labor intensive, and also relies on an individual to accurately track and monitor movement of the electronics system, as well as perform the additional testing.

Additionally, the actual flying profile and environments of an aircraft may be different than the predicted flying profile and environments that were assumed during testing. For example, airplanes are often flown differently than originally envisioned. Mission parameters change with emerging needs. Original assumptions regarding a flight profile typically change throughout the life of the airplane. Further, the lives of many aircraft, particularly military jets, are often extended beyond a planned service life.

Overall, significant effort and resources are expended in monitoring and evaluating the lives of different components of an aircraft. The operator and/or owner of the aircraft often do not have a completely reliable and qualitative understanding of how the lives of the components compare to a planned service usage of the aircraft.

SUMMARY OF THE DISCLOSURE

Certain embodiments of the present disclosure provide a vehicle, such as an aircraft, that may include an operative sub-system positioned within a body, such as a fuselage, of the vehicle. A sensor assembly is secured to the operative sub-system. The sensor assembly may include at least one sensor configured to detect energy, such as vibration and/or shock energy, directed into the operative sub-system, and a processing unit configured to determine damage to the operative sub-system as damage data that is based on one or both of a magnitude and duration of the vibration or shock energy detected by the sensor(s).

The sensor assembly may include a memory in communication with the processing unit. The processing unit may be configured to determine a remaining life of the operative sub-system as a function of the damage data and full life data stored in the memory. In at least one embodiment, the full life data is empirically determined and stored in the memory. In at least one embodiment, the full life data is pre-set and stored in the memory. For example, a manufacturer of the operative sub-system may provide the full life data.

The sensor(s) may include a piezo ceramic sensor that is configured to generate an electrical signal in response to the vibration or shock energy. The processing unit may be powered through the electrical signal. The processing unit analyzes the electrical signal to determine the damage data. Thus, the electrical signal that the processing unit analyzes to determine the damage data may be the same electrical signal that powers the sensor assembly.

The sensor assembly may include an energy generating power supply connected to the piezo ceramic sensor. The energy generating power supply may be configured to receive the electrical signal from the piezo ceramic sensor and output a stable voltage that powers the processing unit.

The sensor assembly may be configured to be in communication with a damage analysis system. For example, the sensor assembly may be removably connected (in that the sensor assembly may be quickly and easily secured and later removed) to the damage analysis system to transfer data therebetween.

In at least one embodiment, the sensor assembly may include a temperature sensor configured to detect a temperature with respect to the operative sub-system (such as in, at a surface, and/or around the operative sub-system). The processing unit may be configured to receive temperature data from the temperature sensor.

The sensor(s) may include one or more of a piezo electric element, an accelerometer, a temperature sensor, a torque sensor, a strain gauge, a pressure sensor, a magnetic field sensor, a differential variable reluctance transducer, or a linear variable differential transformer.

Certain embodiments of the present disclosure provide a sensor assembly configured to determine a remaining life of an operative sub-system of a vehicle. The sensor assembly may include at least one sensor configured to detect vibration or shock energy directed into the operative sub-system, a processing unit configured to determine damage to the operative sub-system as damage data that is based on one or both of a magnitude and duration of the vibration or shock energy detected by the at least one sensor, and a memory in communication with the processing unit. The processing unit may be configured to determine the remaining life of the operative sub-system as a function of at least the damage data and full life data stored in the memory.

Certain embodiments of the present disclosure provide a method of determining a remaining life of an operative sub-system of a vehicle. The method may include determining a full life of the operative sub-system of the vehicle, storing full life data related to the full life of the operative sub-system in a memory of a sensor assembly secured to the operative sub-system, using at least one sensor of the sensor assembly to detect vibration or shock energy directed into the operative sub-system, using at least one processing unit of the sensor assembly to determine damage to the operative sub-system as damage data that is based on one or both of a magnitude and duration of the vibration or shock energy detected by the at least one sensor, and determining the remaining life of the operative sub-system as a function of at least the damage data and full life data stored in the memory. The method may include generating an electrical signal in response to the vibration or shock energy, powering the processing unit and the memory through the electrical signal, and using the processing unit to analyze the electrical signal to determine the damage data.

In at least one embodiment, the sensor(s) may include one or more photovoltaic cells or photodiodes that are configured to generate an electrical signal in response to radiation or light energy. The processing unit may be powered through the electrical signal. The processing unit may analyze the electrical signal to determine the damage data for damage resulting from solar or radiation exposure, for example.

In at least one embodiment, the sensor(s) may include at least one thermoelectric element that is configured to generate an electrical signal in response to a temperature differential. The processing unit may be powered through the electrical signal. The processing unit may analyze the electrical signal to determine the damage data for damage resulting from thermal differentials or thermal cycling.

In at least one embodiment, the sensor(s) may include a sensor that is configured to generate an electrical signal in response to detected energy. The processing unit may be powered through the electrical signal. The processing unit may analyze the electrical signal to determine the damage data for damage resulting from the detected energy.

In at least one embodiment, the operative sub-system may be tuned to operate within a narrow band that correlates or is caused by specific events or conditions. The vibration of a specific item may be actuated or operated, a radiation or solar event, a thermal event, or the like.

DETAILED DESCRIPTION OF THE DISCLOSURE

Figure 1:
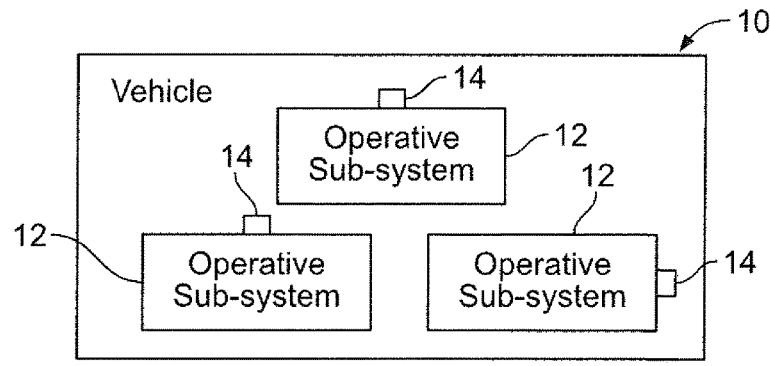
FIG. 1 illustrates a block diagram of a vehicle, according to an embodiment of the present disclosure.

The foregoing summary, as well as the following detailed description of certain embodiments will be better understood when read in conjunction with the appended drawings. As used herein, an element or step recited in the singular and proceeded with the word "a" or "an" should be understood as not excluding plural of the elements or steps, unless such exclusion is explicitly stated. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Embodiments of the present disclosure provide systems and methods for evaluating a useful remaining life of an operative sub-system of a vehicle. The operative sub-system may be an electronics or hardware system of the vehicle. A sensor assembly may be secured to a portion of the operative sub-system. The sensor assembly is configured to detect damage, such as caused by vibration energy, thermal cycling, or radiation exposure, experienced by the operative sub-system. The sensor assembly may be self-charging, thereby providing its own power without the use of a separate and distinct power supply. The sensor assembly is configured to generate data related to the damage experienced by the operative sub-system. The data may be used by the sensor assembly or a damage analysis system to determine the amount of useful life remaining in the operative sub-system.

Embodiments of the present disclosure may be used to determine the useful remaining life of one or more operative sub-systems of an aircraft, such as a commercial or military jet. For example, embodiments of the present disclosure provide systems and methods for evaluating the useful life of operative sub-systems of an aircraft throughout the service history of the aircraft and/or the operative sub-systems. While embodiments of the present disclosure may be used with aircraft, the systems and methods described may also be used with various other vehicles, such as land vehicles (for example, automobiles, locomotives, light rail trains, construction vehicles, military tanks, and the like), boats, submarines, and ships, aerospace vehicles, and the like.

Embodiments of the present disclosure provide a sensor assembly that may be configured to detect energy directed into or onto an operative sub-system. The energy may be internal or external energy that is directed into or onto the operative sub-system. For example, the energy may be external in that it may be generated outside of the operative sub-system and directed into or onto the operative sub-system. Examples of external energy include vibration energy and shock energy directed from a source outside of the operative sub-system. As another example, the energy may be internal in that it may be generated inside of the operative sub-system and directed into or onto the operative sub-system. Examples of internal energy include vibration energy and shock energy generated within the operative sub-system.

Vibration energy may include a force, such as generated by the motion of an aircraft, that has a vibratory frequency that may cause resonance, for example, within the operative sub-system. Shock energy may include any transient energy including, but not limited to, drops, pyrotechnic events, resonance buildups, isolation bottoming out, and the like. Shock energy may be a form of vibration energy, or vice versa, for example.

Embodiments of the present disclosure provide a sensor assembly that may output an electrical status signal regarding an operative sub-system to a remote device, system, or the like, such as a remote monitoring computer, for example. The sensor assembly may be communicatively connected to a separate and distinct device, such as a handheld device, which may receive and analyze data stored within the sensor assembly.

FIG. 1 illustrates a block diagram of a vehicle 10, according to an embodiment of the present disclosure. The vehicle 10 may be an aircraft, such as a commercial or military jet, for example. Alternatively, the vehicle 10 may be a land-based vehicle, a boat or water-based vehicle, an aerospace vehicle, and/or the like.

The vehicle 10 includes a plurality of operative sub-systems 12 located throughout, on, or within the vehicle 10. While the vehicle 10 is shown having three operative sub-systems 12, the vehicle 10 may include more or less operative sub-systems 12 than shown. Each operative sub-system 12 may be an electronics or hardware sub-system. For example, if the vehicle 10 is an aircraft, the operative sub-systems 12 may include a radar system, hydraulic systems, pneumatic systems, a flight control system, a navigation system, one or more communication systems, life support equipment, ordnance delivery systems (such as missile guidance systems), and the like. If the vehicle 10 is an automobile, for example, the operative sub-systems 12 may include a fuel-monitoring system, a tire pressure monitoring system, a navigation system, an engine control system, and/or the like. In short, the operative sub-systems 12 may include any system, hardware, equipment, or the like that has a service life that is to be monitored. The service life decreases when the operative sub-system experiences damage, which may be determined from vibration energy (that is exerted, imparted, or otherwise directed into the operative sub-system) in relation to time or duration of such vibration energy.

A sensor assembly 14 is secured to each operative sub-system 12. The sensor assembly 14 may be mounted flush or substantially flush with a surface of the operative sub-assembly. Optionally, the sensor assembly 14 may not be flush or substantially flush with the surface of the operative sub-assembly. The sensor assembly 14 may be self-contained such that no wiring or the like extends outwardly from a housing of the sensor assembly 14. Optionally, the sensor assembly 14 may be contained in or on one or more locations of the operative sub-system 12. In at least one embodiment, the sensor assembly 14 may be positioned in or on an area of the operative sub-system 12 that be subject to experience high strain energy, while a processing unit of the sensor assembly 14 may be positioned in an area of low strain energy.

The sensor assembly 14 may be securely mounted onto an outer surface of the operative sub-system 12. For example, the sensor assembly 14 may be bonded to an outer surface of the operative sub-system 12. By bonding the sensor assembly 14 directly to the operative sub-system 12, the sensor assembly 14 is able to fully capture vibration and/or shock energy exerted into the operative sub-system 12. The secure bonding between the sensor assembly 14 and the operative sub-system eliminates, minimizes, or otherwise reduces any dampening of the exerted vibration and/or shock energy, thereby allowing the sensor assembly 14 to accurately detect the exerted vibration and/or shock energy that is exerted into the operative sub-system 12. By securing the sensor assembly 14 to the outer surface of the operative sub-system 12, the sensor assembly 14 may be quickly and easily connected to the operative sub-system 12 without modifying the operative sub-system 12. As such, any operative sub-system 12 may be quickly and easily monitored through the use of the sensor assembly 14 in that the sensor assembly 14 may simply be secured to the operative sub-system 12. Alternatively, the sensor assembly 14 may be mounted on any surface, whether interior or outer, of the operative sub-system 12 through adhesives, fasteners, and/or the like.

The sensor assembly 14 is configured to detect damage caused to the operative sub-system 12. For example, the sensor assembly 14 is configured to detect vibration and/or shock energy exerted into the operative sub-system 12 over time and store data related to the damage. The stored data may be used to determine a remaining service life of the operative sub-system 12.

In at least one embodiment, the sensor assembly 14 may be incorporated within an electronics enclosure of the operative sub-assembly 12, thereby providing environmental protection and allowing the sensor assembly 14 to be calibrated to a known system failure mode or frequency. For example, the sensor assembly 14 may be mounted directly to an electronic mother board (which may be particularly sensitive to vibration energy) of an operative sub-assembly 12 and monitor vibration at the location of the electronic mother board.

Figure 2:
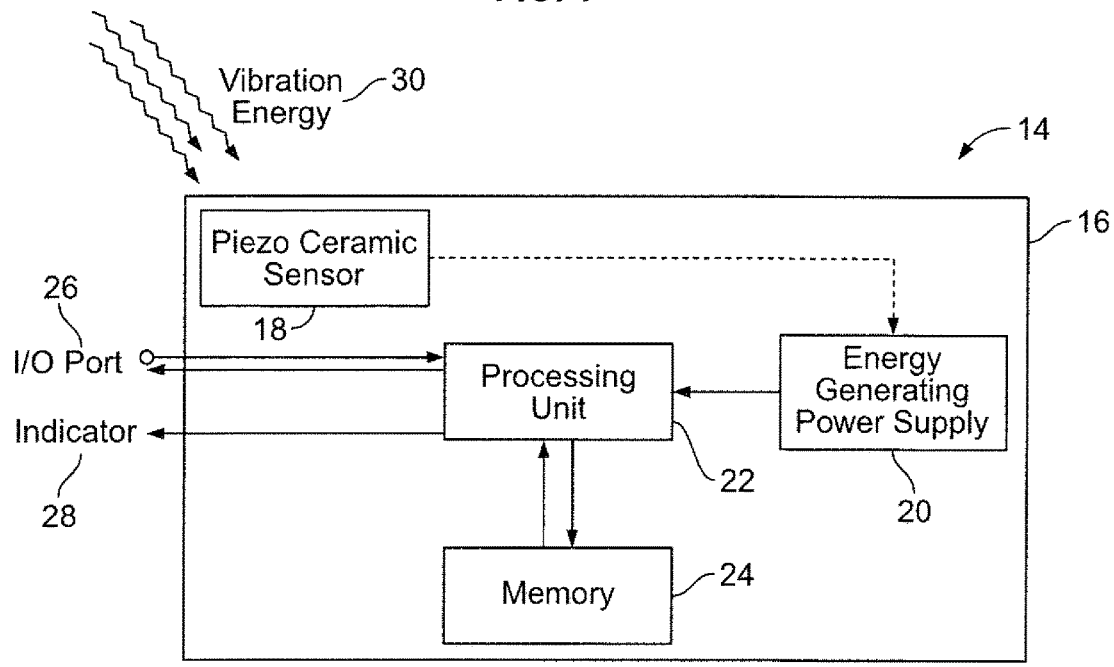
FIG. 2 illustrates a schematic block diagram of a sensor assembly, according to an embodiment of the present disclosure.

FIG. 2 illustrates a schematic block diagram of a sensor assembly 14, according to an embodiment of the present disclosure. The sensor assembly 14 may include an enclosure or housing 16 that contains or otherwise supports a piezo ceramic sensor 18 that is in electrical communication with an energy generating power supply 20 and/or a processing unit 22. The processing unit 22 may include, or otherwise be in communication with, a memory 24. An input/output (I/O) port 26 may connect to the processing unit 22. The processing unit 22 may also be in communication with a life indicator 28.

The piezo ceramic member, element, or device, such as the piezo ceramic sensor 18, may be or include a piezo ceramic wafer, plate, disk, or the like. The piezo ceramic sensor 18 is configured to detect force exerted therein, such as vibratory energy, and convert the detected force to an electric charge. For example, the piezo ceramic sensor 18 may generate a voltage when it deforms in response to vibration and/or shock energy 30 imparted, exerted, or otherwise directed into the piezo ceramic sensor 18. The piezo ceramic sensor 18 may generate an electrical signal through a vibration induced flexure. The generated electrical signal, such as a voltage, may be used to power the sensor assembly 14. Accordingly, when the vibration energy 30 is imparted, exerted, or otherwise directed into the piezo ceramic sensor 18 (and therefore the operative sub-assembly 12 onto which the sensor assembly 14 is secured), causing a vibration induced flexure in the piezo ceramic sensor 18, an electrical signal, such as a voltage, passes from the piezo ceramic sensor 18 to the energy generating power supply 20 and/or the processing unit 22. The electrical signal generated by the piezo ceramic sensor 18 powers the sensor assembly 14. As such, the sensor assembly 14 does not need a separate and distinct power supply, such as a battery.

The energy generating power supply 20 may be or include one or more capacitors, rectifiers, inductors, or the like that receive the electrical signal from the piezo ceramic sensor 18. In general, the energy generating power supply 20 may be or include any circuit that delivers direct current at a stable voltage. For example, the energy generating power supply 20 may be or include switching power supplies, buck/boost converters, linear regulators, simple and/or full-wave rectifiers, rectifiers with filter capacitors to stabilize voltage, and/or the like. The energy generating power supply 20 may convert the electrical signal received from the piezo ceramic sensor 18 into a stable voltage that is used to activate and power the processing unit 22. Alternatively, the sensor assembly 14 may not include the energy generating power supply 20. Instead, the electrical signal generated by the piezo ceramic sensor 18 (in response to the exerted vibration energy 30) may pass directly to the processing unit 22 and directly power the processing unit 22, and therefore the sensor assembly 14.

As the generated electrical signal from the piezo ceramic sensor 18 powers the sensor assembly 14, the processing unit 22 analyzes the electrical signal to determine the degree of damage caused by the vibration energy 30. As such, the electrical signal generated by the piezo ceramic sensor 18 may power the sensor assembly 14 and also be analyzed by the processing unit 22 to determine damage data. For example, the damage may be a function of the magnitude of the vibration energy 30 and the time or duration of the vibration energy 30. The processing unit 22 may store the detected damage caused by the vibration energy 30 and store data related to the detected damage within the memory 24. The memory 24 may also store full and remaining life data of the operative sub-assembly 12 to which the sensor assembly 14 is secured. The processing unit 22 may determine the remaining life data as a function of the damage data and the full life data. For example, the processing unit 22 may compare the data related to the detected damage (for example, damage data) with the full life data to determine the remaining life of the operative sub-assembly 12 after it has been subjected to the vibration energy 30. For example, remaining life data may be determined as the damage data subtracted from (or added to) the life data, damage data divided by (or multiplied with) the life data, and/or the like. The processing unit 22 may store the remaining life data in the memory 24.

The full life of an operative sub-assembly 12 may be empirically determined. For example, the full life of an operative sub-assembly 12 may be determined through prior knowledge, data, statistics, and/or the like for a particular type of operative sub-assembly. Optionally, a manufacturer, for example, may pre-set the full life of an operative sub-assembly based on knowledge of the full life of a particular type of operative sub-assembly.

The processing unit 22 may communicate through a wired or wireless connection with a damage analysis system, such as a separate and distinct computing device, through the I/O port 26. For example, an individual may retrieve stored remaining life data within the memory 24 by connecting a computing device (such as a personal or notebook computer, a tablet, such as a smart phone or smart device, or the like) to the processing unit 22 through the I/O port 26. Data stored within the memory 24 may then be retrieved by the separate and distinct computing device.

The processing unit 22 may be or include one or more control units, circuits, or the like, such as processing devices that may include one or more microprocessors, microcontrollers, integrated circuits, and the like. The memory 24 may be or include non-volatile memory, random access memory, and/or the like. The memory 24 may include any suitable computer-readable media used for data storage. The computer-readable media are configured to store information that may be interpreted by the processing unit 22. The information may be data or may take the form of computer-executable instructions, such as software applications, that cause a microprocessor or other such control unit within the processing unit 22 to perform certain functions and/or computer-implemented methods. The computer-readable media may include computer storage media and communication media. The computer storage media may include volatile and non-volatile media, removable and non-removable media implemented in any method or technology for storage of information such as computer-readable instructions, data structures, program modules or other data. The memory 24 and/or computer storage media may include, but are not limited to, RAM, ROM, EPROM, EEPROM, or other solid state memory technology, CD-ROM, DVD, or other optical storage, magnetic cassettes, magnetic tape, magnetic disk storage or other magnetic storage devices, or any other medium which may be used to store desired information and that may be accessed by components of the processing unit 22.

The processing unit 22 may utilize the indicator 28 to indicate the remaining life of the operating sub-system 12 to which the sensor assembly 14 secures. For example, the indicator 28 may be a light, such as light-emitting diode (LED). When the remaining life of the operating sub-system 12 is within a certain range indicating a full to relatively full remaining life, the indicator 28 may emit a first colored light, such as green. When the remaining life of the operating sub-system 12 is less than a relatively full life but more than a low life, the indicator may emit a second colored light, such as yellow. When the remaining life of the operating sub-system 12 is at a low level, the indicator may emit a third colored light, such as red.

Alternatively, the indicator 28 may be various other types of visual or audio indicating devices, which may or may not utilize power to be operated. For example, the indicator may include a stamp or pin that is configured to puncture or otherwise mark a sheet (such as a plastic or paper sheet) when the processing unit 22 determines a life level change. For example, at full life, the sheet may not include any punctures or perforations. When the processing unit 22 determines an intermediate life level that is less than a full life, the processing unit 22 may then activate the stamp or pin to puncture or otherwise mark the sheet with a single puncture or mark. As such, even when no vibration energy 30 is present to power the sensor assembly 14, the sheet still shows a puncture, mark, or perforation, or the like. When a threshold for low life is met, the processing unit 22 may activate the stamp or pin to make an additional puncture or mark.

Referring to FIGS. 1 and 2, when the vehicle 10 is being operated, the vehicle 10 experiences vibration and/or shock energy 30. The vibration and/or shock energy 30 is exerted, imparted, or otherwise directed into each operative sub-system 12 and detected by the sensor assembly 14 mounted thereto. The piezo ceramic sensor 18 converts the vibration and/or shock energy 30 into an electrical signal that is used to power the sensor assembly 14. The processing unit 22 receives the electrical signal, which may be a function of vibration magnitude and duration, to analyze the resulting damage to the operative sub-system 12 and output damage data regarding the vibration energy 30. The processing unit 22 may compare the damage data with full life data (for example, data related to a cumulative amount of damage that the operative sub-system 12 may withstand and still properly function) stored within the memory 24 to determine the remaining life of the operative sub-system 12. When the vehicle 10 is deactivated, the vehicle 10 may no longer experience vibration energy 30. Accordingly, the sensor assembly 14 powers off and enters a dormant state in which it no longer detects vibration energy and stores damage data. In this manner, the sensor assembly 14 automatically detects vibration energy and determines damage data without any intervention from a human operator. A maintenance operator may then periodically check the sensor assembly 14 to access the stored damage data and remaining life data, for example. In at least one embodiment, the maintenance operator may connect a handheld probe that provides power to the sensor assembly 14 and a data interface so that data may be transferred from the sensor assembly 14 to the probe. After the data has been transferred, the operator may remove the probe from the sensor assembly 14.

Notably, any of the operative sub-assemblies 12 may be moved within a vehicle or to a different vehicle without additional testing. The sensor assemblies 14 automatically monitor the remaining life of each operative sub-assembly 12 without the need for individuals tracking the movement of the operative sub-assemblies and/or conducting additional testing. The sensor assemblies 14 acquire and report damage data accurately and independently of external parameters. The sensor assemblies 14 have an indefinite shelf life because they do not contain separate and distinct power sources, such as batteries. Instead, each sensor assembly 14 is automatically powered by the electrical signals generated by the piezo ceramic element in response to vibration energy 30 that is exerted, imparted, or otherwise directed into the sensor assembly 14 (and the operative sub-assembly 12).

As noted, the sensor assembly 14 may compare damage data in relation to data regarding a full life of the operative sub-assembly 12 (for example, full life data) to determine remaining life data indicative of the remaining life of the operative sub-assembly 12. Full life data may be stored in the memory 24. Examples of methods of determining full life data are set forth below.

Criteria may be established based on vibration or shock to define the full life data. The full life data may be data regarding a threshold or rating regarding a certain amount of damage over time. For example, the full life data may be a maximum cumulative amount of damage that an operative sub-assembly may be configured or designed to withstand. In at least one embodiment, the sensor assembly 14 may be secured to the operative sub-assembly 12 during a vibration and shock qualification test, and configured to record data in different magnitude bins. The recorded data during the test may be used as a baseline or threshold level that may be used to establish the full life data.

In at least one embodiment, the full life data may be based on a full life determination analysis. For example, a finite element model may be run to evaluate the natural frequency of one or more components of the operative sub-assembly 12 at an intended mounting point and an analytical life may be established as a damage level that does not exceed a particular threshold. For example, a maximum damage level may be set and stored as full life data. When no damage data is recorded, the processing unit 22 of the sensor assembly 14 may determine that the operative sub-assembly 12 has a full remaining life. When the maximum damage level is reached, the processing unit 22 may determine that the operative sub-assembly 12 has zero life remaining.

In at least one other embodiment, a full life of an operative sub-assembly may be pre-set and/or pre-determined by a manufacturer. The pre-set or predetermined full life may be stored as full life data within the memory of the sensor assembly 14.

The sensor assemblies 14 may be used in a static or substantially static manner to determine whether the operative sub-assemblies 12 (such as electronics or structure thereof) have been subjected to vibrations and/or shocks in excess of known capability thresholds. The sensor assemblies may indicate remaining life indications, such as noted above, that may be observed during routine review by maintenance personnel. Alternatively, the sensors assemblies may be in communication with onboard computers of the vehicle 10, and may actively communicate remaining life data, such as through wired or wireless connection, to an operator of the vehicle 10 and/or maintenance personnel.

Each sensor assembly 14 may also determine and store a fatigue damage factor. The processing unit 22 may determine the fatigue damage factor by storing individual vibration peak magnitudes into data bins that are stored within the memory 24. For example, a shock or vibration energy at 1G may be counted by the processing unit 22 and stored in a first data bin with the memory 24. A shock or vibration energy between 1G and 2G may be counted by the processing unit 22 and stored in a second data bin with the memory 24. The processing unit 22 may count and store various vibratory energies at various force levels in multiple data bins within the memory 24. Stored data peaks, such as shock or vibration energy at various force levels stored in separate and distinct data bins, may be saved throughout the life of the operative sub-system 12. The remaining life data may then be adjusted based on a qualification or analytically defined definition of full life.

In one embodiment, Miners Cumulative Fatigue Hypothesis, as shown in Equation (1), may be used to determine remaining life data.

$$\% \text{ Life}_{expended} = [\text{Cycles experienced in bin 1/cycles allowed in Bin 1} + \ldots]*100 \qquad \text{Equation (1)}$$

In at least one other embodiment, damage accumulated in each data bin may be compressed to a particular level. For example, $$W^m_1 T_1 = W^m_1 T_1 \quad \text{Equation (2)}$$

where W represents the energy within a given bin and T represents the time spent, or cycles, in the bin. M is a material dependent compression constant. Through Equation (2), the individual bins of damage may be compressed to an arbitrary level such as the qualification test level, then compared to a qualification time as follows:

$$\% \text{ Life}_{expended} = [\text{time experienced at qual. level/time of qual. test}]*100 \quad \text{Equation (3)}$$

Equations (1)-(3) represent examples of methods to calculate remaining life data. Various other equations and methods may be used. For example, as noted above, remaining life data may be determined by subtracting damage data from full life data. Alternatively, remaining life data may be determined by dividing damage data by full life data, or multiplying remaining life data with full life data.

Each sensor assembly 14 may also be used to determine when an operational sub-system 12 changes state. For example, a crack growing in a structure generally lowers a natural frequency of the structure. The sensor assembly 14 may detect the change in natural frequency and store the changing natural frequency as changing data. The changing data may be used to determine a pending failure of the operative sub-system 12, for example. Another changing state example may be isolated equipment that responds at a predetermined frequency. The sensor assembly 14 may be used to evaluate the health of the isolation system and notify a pilot or maintenance personal if the frequency shift of the isolation system indicates an isolator failure.

Embodiments of the present disclosure provide a sensor assembly 14 that mounts to an operative sub-assembly 12 to determine the remaining life of the operative sub-assembly 12. If the remaining life of the operative sub-assembly 12 is less than the pre-set or predetermined full life data, maintenance personnel may be alerted to remove the operative sub-assembly 12. Similarly, if the stored remaining life data indicates that the operative sub-assembly 12 is losing life faster than expected, then the maintenance personnel may modify the mounting characteristics of the operative sub-assembly 12, or isolate or replace the operative sub-assembly 12.

Many aircraft are flown beyond intended service lifetime. Embodiments of the present disclosure allow for engineering evaluation of all operative sub-systems, such as onboard electronic systems, of an aircraft. Individual electronics may demonstrate significant life remaining, while others may require rework to meet the longer than expected life of the aircraft. Using the data provided by the sensor assemblies 14, the electronics may be quantitatively evaluated without costly serial number and tail tracking.

Figure 3:
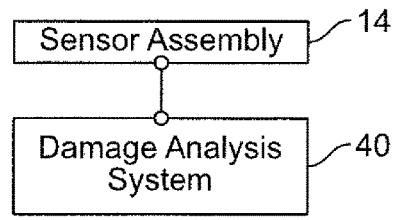
FIG. 3 illustrates a schematic block diagram of a sensor assembly connected to a damage analysis system, according to an embodiment of the present disclosure.

FIG. 3 illustrates a schematic block diagram of a sensor assembly 14 connected to a damage analysis system 40, according to an embodiment of the present disclosure. The damage analysis system 40 may connect to the I/O port of the sensor assembly 14 to receive stored damage data, remaining life data, and the like, from the sensor assembly 14 (which is mounted to an operative sub-assembly 12). The damage analysis system 40 may communicate with the sensor assembly 14 through a wire or wireless connection.

The damage analysis system 40 may be or include a portable device, such as a handheld smart phone or device, a laptop computer, or the like that stores data retrieved from the sensor assembly 14. For example, the damage analysis system 40 may be a handheld device used by maintenance personnel. In at least one embodiment, the damage analysis system 40 may receive raw data, such as stored force data (for example, experienced G peak data stored in bins), and determine remaining life of and/or fatigue damage to the operative sub-assembly through the raw data. Optionally, the damage analysis system 40 may communicate with a central computer that analyzes the data to determine remaining life and/or fatigue damage.

After the damage analysis system 40 has received data from the sensor assembly 14, the damage analysis system 40 may be disconnected from the sensor assembly 14. In this manner, maintenance personnel may periodically check the status of an operational sub-assembly 12. The maintenance personnel may also re-program the sensor assembly 14, reset the usable life after a rebuild or replacement of a component of the sensor assembly 12, or add, remove, or modify functions of the sensor assembly 12.

Figure 4:
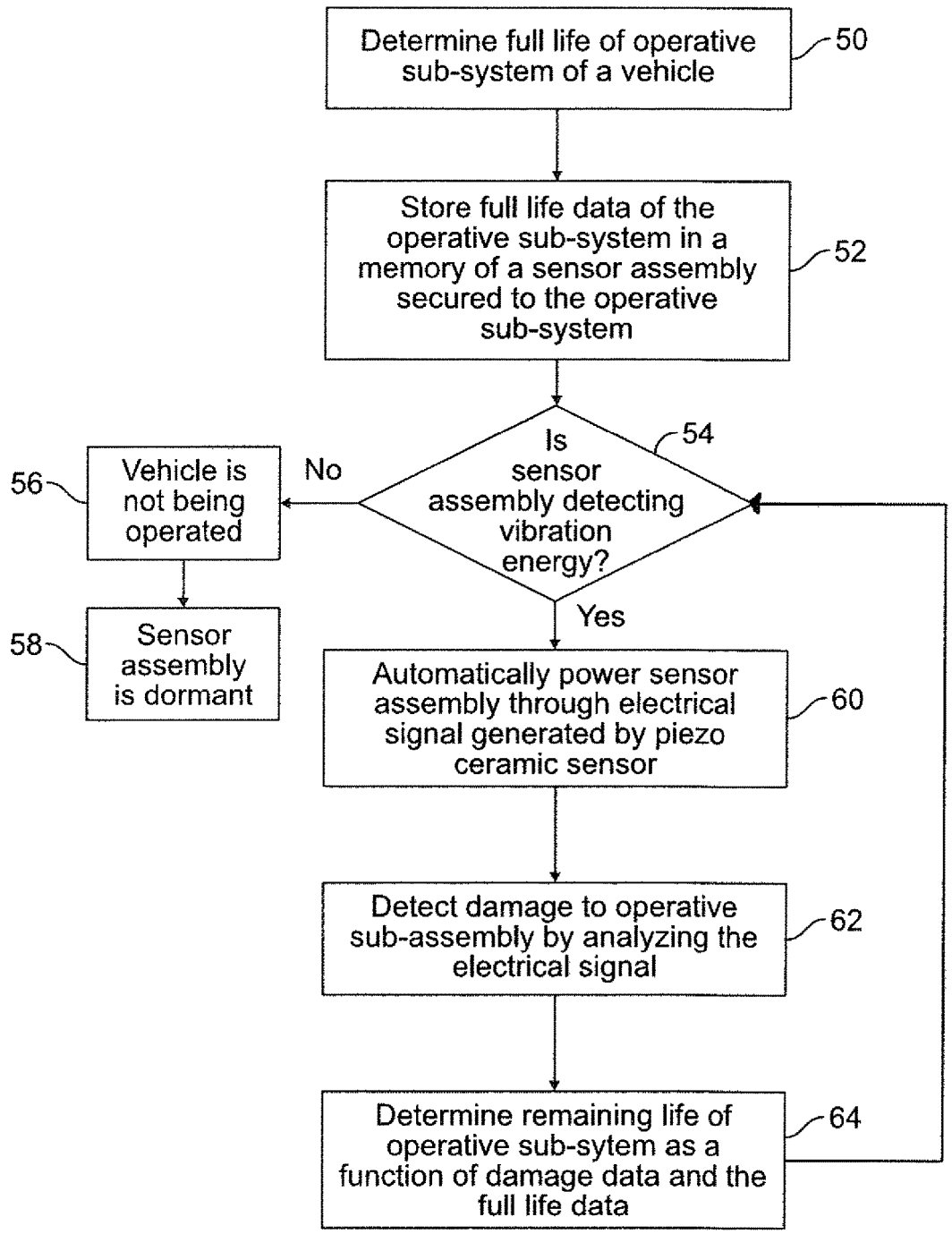
FIG. 4 illustrates a flow chart of a method of determining a remaining life of an operative sub-assembly of a vehicle, according to an embodiment of the present disclosure.

FIG. 4 illustrates a flow chart of a method of determining a remaining life of an operative sub-assembly of a vehicle, according to an embodiment of the present disclosure. The method begins at 50, in which a full life of an operative sub-system of a vehicle is determined. For example, the full life may be a predetermined or pre-set figure determined by a manufacturer of the operative sub-system. Optionally, the full life may be empirically or analytically determined, such as during a testing stage of the operative sub-assembly. Next, at 52, full life data regarding the full life of the operative sub-system is stored in a memory of a sensor assembly that is secured to the operative sub-system.

At 54, it is determined whether the sensor assembly is detecting vibration energy. If the sensor assembly detects vibration energy, then the vibration energy is being exerted or otherwise directed into the operative sub-assembly. If the sensor assembly is not detecting vibration energy, the vehicle is not currently being operated at 56, and the sensor assembly is dormant at 58. If, however, the sensor assembly is detecting vibration energy, at 60, the sensor assembly is automatically powered through an electrical signal generated by a piezo ceramic sensor within the sensor assembly. At 62, damage to the operative sub-assembly is detected through an analysis of the electrical signal generated by the piezo ceramic sensor (notably, the same electrical signal that is used to power the sensor assembly). At 64, the remaining life of the operative sub-assembly is determined as a function of damage data and the full life data. The process then returns to 54.

Figure 5:
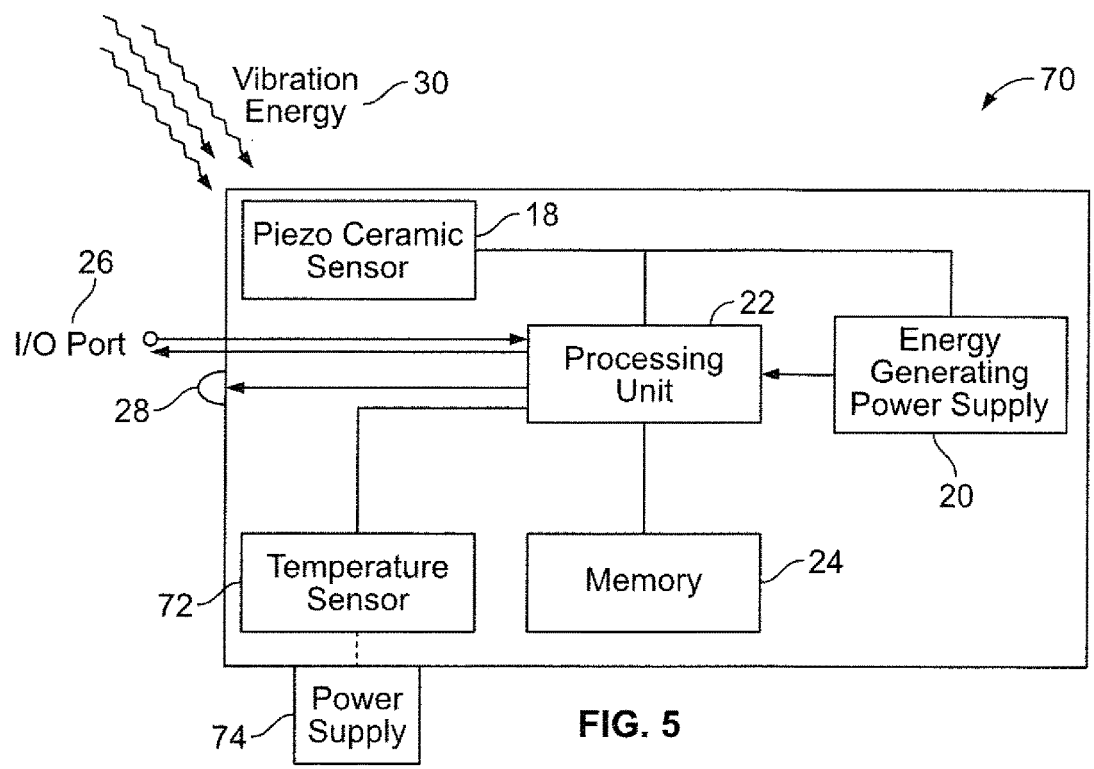
FIG. 5 illustrates a schematic block diagram of a sensor assembly, according to an embodiment of the present disclosure.

FIG. 5 illustrates a schematic block diagram of a sensor assembly 70, according to an embodiment of the present disclosure. The sensor assembly 70 is similar to the sensor assembly 14, shown in FIG. 1. In addition, the sensor assembly 70 may include a temperature sensor 72 in communication with the processing unit 22. The temperature sensor 72 may be an analog or digital thermometer, thermostat, or the like that is configured to detect the temperature of the sensor assembly 70 and/or the operative sub-assembly to which the sensor assembly 70 is secured. The temperature sensor 72 may include an extension (such as a temperature sensing distal tip) that is configured to be inserted into a portion of the operative sub-assembly in order to detect the temperature within the operative sub-assembly.

The processing unit 22 receives temperature data and stores the temperature data within the memory 24. The temperature data and the damage data may be used to determine the remaining life of the operative sub-assembly. For example, the processing unit 22 may determine the remaining life data as a function of the damage data, the temperature data, and the full life data.

The processing unit 22 may be powered on and configured to receive temperature data when the piezo ceramic sensor powers the sensor assembly 70 by generating an electrical signal in response to the vibration energy, as described above. Notably, however, when the vehicle is not being operated, the vehicle may still be subjected to adverse temperatures. As such, the temperature sensor 72 and/or the processing unit 22 may be operatively connected to a power supply 74, such as one or more batteries, one or more thermoelectric semiconductor elements, one or more photodiodes, one or more solar cells, or the like, that provide energy to the processing unit 22 to receive temperature data and store such in the memory 24 even when the sensor assembly 70 is not being subjected to vibration energy 30. For example, a thermoelectric semiconductor element may generate electricity through thermal differentials. Alternatively, the sensor assembly 70 may not include the power supply.

Figure 6:
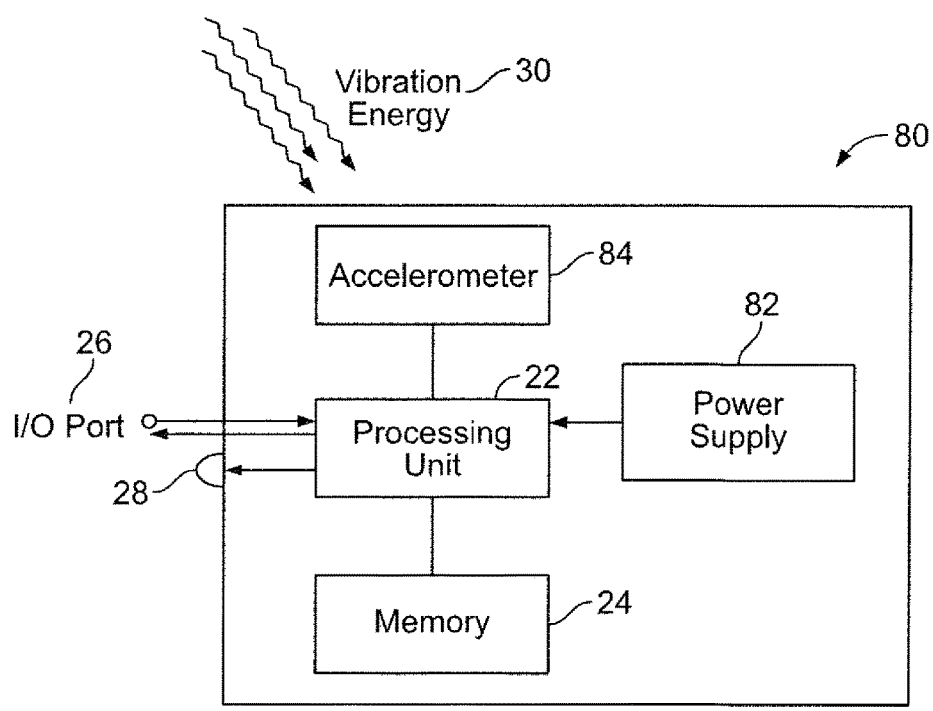
FIG. 6 illustrates a schematic block diagram of a sensor assembly, according to an embodiment of the present disclosure.

FIG. 6 illustrates a schematic block diagram of a sensor assembly 80, according to an embodiment of the present disclosure. The sensor assembly 80 is similar to the sensor assembly 14, shown in FIG. 2, except that the sensor assembly 80 does not include a piezo ceramic sensor. Instead, the sensor assembly 80 may include a power supply 82 (such as a battery or connecting interface to a power supply of a vehicle) and an accelerometer 84. The power supply 82 provides power to the processing unit 22 to operate the sensor assembly 80. The accelerometer 84 is used to detect the vibration and/or shock energy 30 exerted into the sensor assembly 80.

Referring to FIGS. 1-6, in at least one embodiment, the sensor(s) may include one or more photovoltaic cells or photodiodes that are configured to generate an electrical signal in response to radiation or light energy. The processing unit may be powered through the electrical signal. The processing unit may analyze the electrical signal to determine the damage data for damage resulting from solar or radiation exposure, for example.

In at least one embodiment, the sensor(s) may include at least one thermoelectric element that is configured to generate an electrical signal in response to a temperature differential. The processing unit may be powered through the electrical signal. The processing unit may analyze the electrical signal to determine the damage data for damage resulting from thermal differentials or thermal cycling.

In at least one embodiment, the sensor(s) may include a sensor that is configured to generate an electrical signal in response to detected energy. The processing unit may be powered through the electrical signal. The processing unit may analyze the electrical signal to determine the damage data for damage resulting from the detected energy.

In at least one embodiment, the operative sub-system may be tuned to operate within a narrow band that correlates or is caused by specific events or conditions. The vibration of a specific item may be actuated or operated, a radiation or solar event, a thermal event, or the like.

Figure 7:
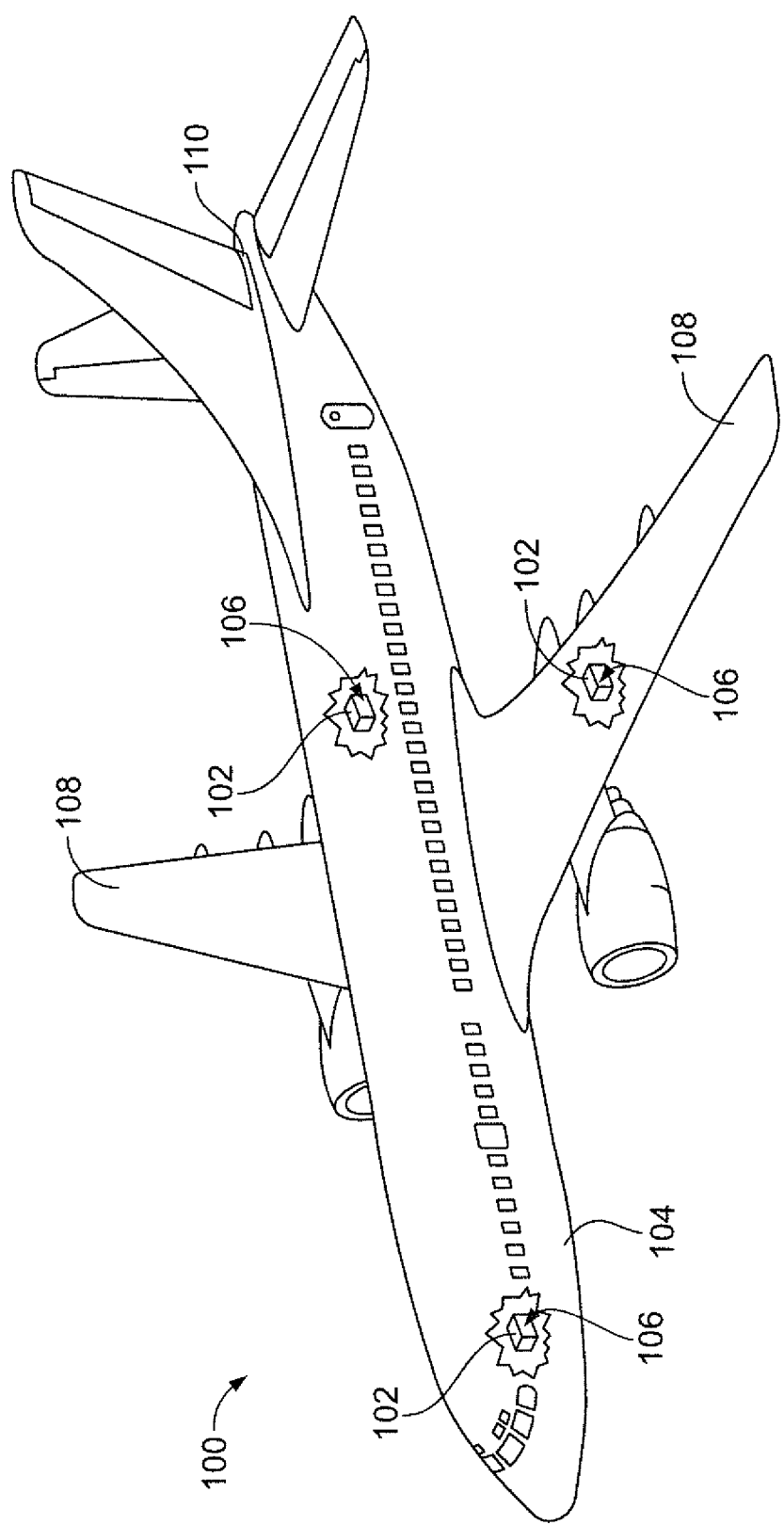
FIG. 7 illustrates a perspective view of an aircraft, according to an embodiment of the present disclosure.

FIG. 7 illustrates a perspective view of an aircraft 100, according to an embodiment of the present disclosure. The aircraft 100 is an example of a vehicle that includes a plurality of operative sub-systems 102. The aircraft 100 includes a fuselage 104. Operative sub-systems 102 may be positioned throughout the fuselage 104. Operative sub-systems 102 may also be positioned at various areas of the aircraft 100, including wings 108, tail 110, and the like. A sensor assembly 106 may be secured to each operative sub-system 102.

As described above, embodiments of the present disclosure provide systems and method for determining a remaining life of an operative sub-assembly of a vehicle. A sensor assembly may be securely mounted to the operative sub-assembly and detect vibration energy exerted, imparted, or otherwise directed into the operative sub-assembly. The sensor assembly may be automatically powered through an electrical signal generated through detection of the vibration energy. The sensor assembly determines damage to the operative sub-assembly through the generated electrical signal or other such signal received from a vibration-detecting component (for example, a piezo ceramic, accelerometer, or the like). The sensor assembly may analyze damage data in relation to full life data in order to determine the remaining full life of the operative sub-assembly.

The sensor assembly may be self-charging. That is, the sensor assembly may not include or utilize a separate and distinct power source, such as a battery. The sensor assembly may be a stand-alone unit that secures to the operative sub-assembly. The sensor assembly may generate its own power through the vibration and/or shock energy that it detects.

The sensor assembly may include various sensors, such as one or more of a piezo electric element, a temperature sensor, a torque sensor, a strain gauge, a pressure sensor, a magnetic field sensor, a differential variable reluctance transducer, a linear variable differential transformer, a radiation sensor, a photo cell diode or sensor, a thermoelectric semiconductor element, and/or the like that are used to detect various aspects related to operational health of the operative sub-assembly to which the sensor assembly is secured. The various sensors may be powered through the electrical power generated by the piezo electric sensor(s), for example.

Embodiments of the present disclosure provide a sensor assembly that includes a piezo ceramic element that is able to generate an electrical signal that powers the sensor assembly when the sensor assembly is subjected to external force, such as vibration energy. The sensor assembly may not include a separate and distinct energy storage medium, such as a battery.

As used herein, the term "computer," "control unit," or "module" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer," "control unit," or "module."

The computer or processor executes a set of instructions that are stored in one or more storage elements, in order to process data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the subject matter described herein. The set of instructions may be in the form of a software program. The software may be in various forms such as system software or application software.

Further, the software may be in the form of a collection of separate programs or modules, a program module within a larger program or a portion of a program module. The software also may include modular programming, in the form of object-oriented programming. The processing of input data by the processing machine may be in response to user commands, or in response to results of previous processing, or in response to a request made by another processing machine.

The diagrams of embodiments herein may illustrate one or more control units or modules. It is to be understood that the control units or modules represent circuit modules that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the modules may represent processing circuitry such as one or more field programmable gate array (FPGA), application specific integrated circuit (ASIC), microprocessor(s), a quantum computing device, and/or the like. The circuit modules in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

The above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended clauses, along with the full scope of equivalents to which such clauses are entitled. In the appended clauses, the terms "including" and "in which" are used as the plain-English equivalents of the respective terms "comprising" and "wherein." Moreover, in the following clauses, the terms "first," "second," and "third," etc. are used merely as labels, and are not intended to impose numerical requirements on their objects. Further, the limitations of the following clauses are not written in means-plus-function format and are not intended to be interpreted based on 35 U.S.C. §112(f), unless and until such clause limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the clauses, and may include other examples that occur to those of ordinary skill in the art. Such other examples are intended to be within the scope of the clauses if they have structural elements that do not differ from the literal language of the clauses, or if they include equivalent structural elements with insubstantial differences from the literal languages of the clauses.

What is claimed is:

1. A vehicle comprising:
an operative sub-system positioned within an internal portion of the vehicle; and
a sensor assembly secured to the operative sub-system, wherein the sensor assembly includes: (a) at least one sensor configured to detect vibration or shock energy directed into the operative sub-system, wherein the at least one sensor is configured to generate an electrical signal in response to the vibration or shock energy; and (b) a processing unit configured to determine damage to the operative sub-system as damage data that is based on one or both of a magnitude and duration of the vibration or shock energy detected by the at least one sensor, wherein the processing unit is powered through the electrical signal, and wherein the processing unit analyzes the electrical signal that is used to power the processing unit to determine the damage data.

2. The vehicle of claim 1, wherein the sensor assembly further comprises a memory in communication with the processing unit, wherein the processing unit is configured to determine a remaining life of the operative sub-system as a function of the damage data and full life data stored in the memory.

3. The vehicle of claim 2, wherein the full life data is empirically determined and stored in the memory.

4. The vehicle of claim 2, wherein the full life data is pre-set and stored in the memory.

5. The vehicle of claim 1, wherein the sensor assembly further comprises an energy generating power supply connected to the at least one sensor, wherein the energy generating power supply is configured to receive the electrical signal from the at least one sensor and output a stable voltage that powers the processing unit.

6. The vehicle of claim 1, wherein the sensor assembly is configured to be in communication with a damage analysis system.

7. The vehicle of claim 1, wherein the sensor assembly further comprises a temperature sensor configured to detect a temperature with respect to the operative sub-system, wherein the processing unit is configured to receive temperature data from the temperature sensor, and wherein the processing unit is configured to determine a remaining life of the operative sub-system as a function of at least the damage data and the temperature data.

8. The vehicle of claim 1, wherein the at least one sensor comprises one or more of a piezo electric element, an accelerometer, a temperature sensor, a torque sensor, a strain gauge, a pressure sensor, a magnetic field sensor, a differential variable reluctance transducer, or a linear variable differential transformer.

9. A sensor assembly configured to determine a remaining life of an operative sub-system of a vehicle, the sensor assembly comprising:
   at least one sensor configured to detect vibration or shock energy directed into the operative sub-system, wherein the at least one sensor comprises a piezo ceramic sensor that is configured to generate an electrical signal in response to the vibration or shock energy;
   a processing unit configured to determine damage to the operative sub-system as damage data that is based on one or both of a magnitude and duration of the vibration or shock energy detected by the at least one sensor, wherein the processing unit analyzes the electrical signal to determine the damage data; and
   a memory in communication with the processing unit, wherein the processing unit is configured to determine the remaining life of the operative sub-system as a function of at least the damage data and full life data stored in the memory, wherein the processing unit and the memory are powered through the electrical signal that is analyzed by the processing unit to determine the damage data.

10. The sensor assembly of claim 9, wherein the full life data is one of analytically determined and stored in the memory, or pre-set and stored in the memory.

11. The sensor assembly of claim 9, wherein the sensor assembly further comprises an energy generating power supply connected to the piezo ceramic sensor, wherein the energy generating power supply is configured to receive the electrical signal from the piezo ceramic sensor and output a stable voltage that powers the processing unit.

12. The sensor assembly of claim 9, wherein the sensor assembly further comprises a temperature sensor configured to detect a temperature with respect to the operative sub-system, wherein the processing unit is configured to determine the remaining life of the operative sub-system as a function of at least the damage data, a temperature data, and the full life data.

13. The sensor assembly of claim 9, wherein the at least one sensor comprises one or more of a piezo electric element, an accelerometer, a temperature sensor, a torque sensor, a strain gauge, a pressure sensor, a magnetic field sensor, a differential variable reluctance transducer, or a linear variable differential transformer.

14. A method of determining a remaining life of an operative sub-system of a vehicle, the method comprising:
   determining a full life of the operative sub-system of the vehicle;
   storing full life data related to the full life of the operative sub-system in a memory of a sensor assembly secured to the operative sub-system;
   using at least one sensor of the sensor assembly to detect vibration or shock energy directed into the operative sub-system;
   generating an electrical signal in response to the vibration or shock energy;
   using at least one processing unit of the sensor assembly to determine damage to the operative sub-system as damage data that is based on one or both of a magnitude and duration of the vibration or shock energy detected by the at least one sensor, wherein the using the at least one processing unit comprises using the at least one processing unit to analyze the electrical signal to determine the damage data;
   powering the processing unit and the memory through the electrical signal that is analyzed by the at least one processing unit to determine the damage data; and
   determining the remaining life of the operative sub-system as a function of at least the damage data and full life data stored in the memory.

15. The method of claim 14, wherein the determining a full life of the operative sub-system of the vehicle comprises one of analytically determining the full life, or pre-setting the full life.

16. The method of claim 14, further comprising detecting a temperature with respect to the operative sub-system.

17. The method of claim 16, further comprising using the processing unit to determine the remaining life of the operative sub-system as a function of at least the damage data, a temperature data, and the full life data.

* * * * *